Dec. 30, 1958 R. A. LAPLANTE 2,866,866
FLUID SUPPLY AND LEVEL INDICATING SYSTEM
Filed Nov. 16, 1956
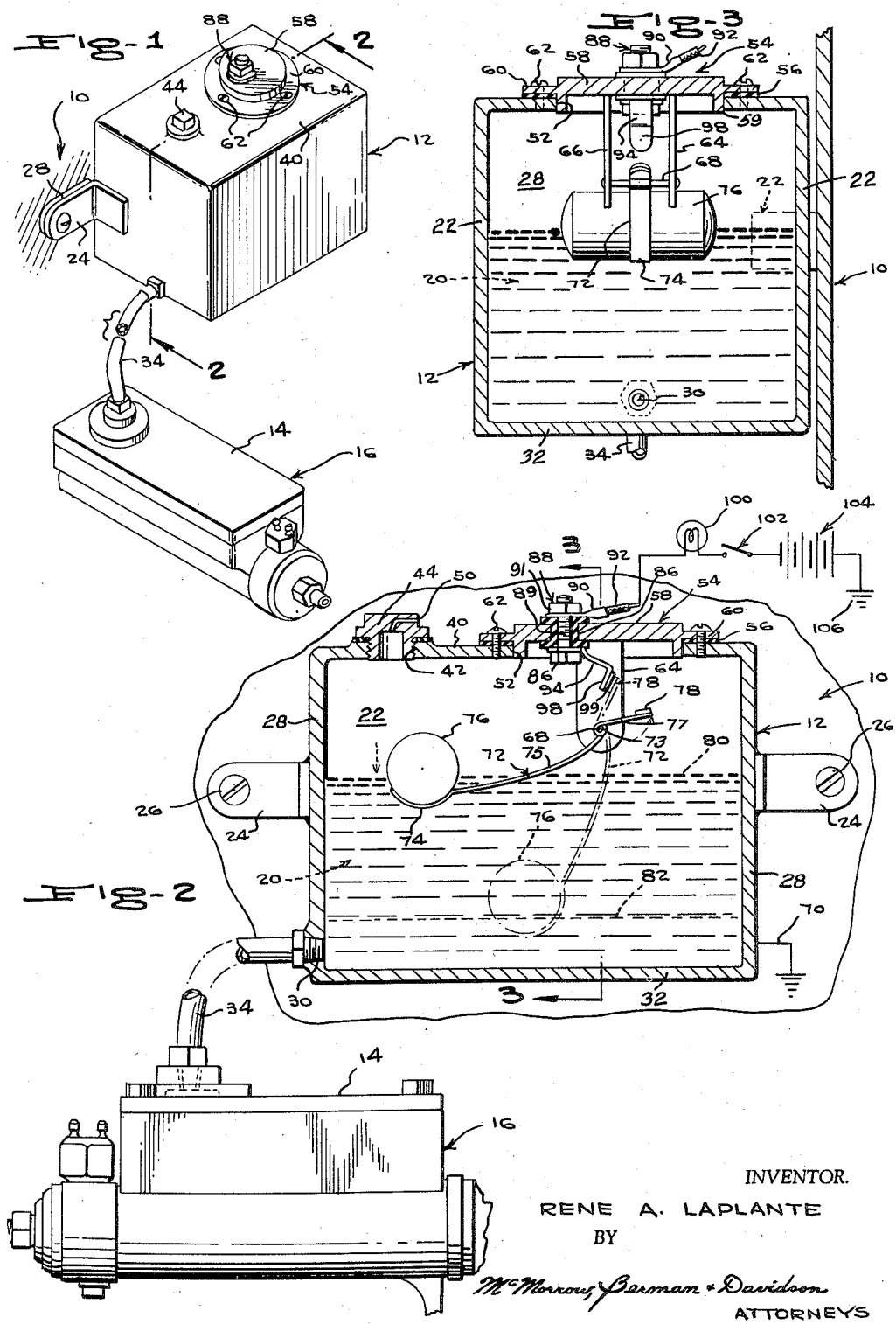
INVENTOR.
RENE A. LAPLANTE
BY
McMorrow, Berman & Davidson
ATTORNEYS United States Patent Office 2,866,866
Patented Dec. 30, 1958

2,866,866

FLUID SUPPLY AND LEVEL INDICATING SYSTEM

Rene A. Laplante, St. Petersburg, Fla.

Application November 16, 1956, Serial No. 622,681

2 Claims. (Cl. 200—84)

This invention relates to hydraulic fluid systems, and more particularly to an improved float switch for the reservoirs thereof, operable to operate a signal warning of a low level of fluid therein.

Although the invention is described in detail herein relative to a vehicle hydraulic brake system, the novel features thereof may be readily incorporated in other hydraulic systems.

The primary object of the invention is to provide a more practical and efficient switch, and a combination of such switch and a hydraulic fluid reservoir, which is simple in construction, composed of a small number of simple, easily assembled, and easily serviced parts, which is easy to install, and is reliable and accurate in operation.

Another object of the invention is to provide a float switch in the context as indicated, which can be made in rugged and serviceable forms at relatively low cost, is easily replaced when necessary, and is highly satisfactory, safe for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a fragmentary perspective view of a brake master cylinder connected to a fluid reservoir equipped with a float switch of the present invention;

Figure 2 is an enlarged vertical longitudinal section view taken substantially on the plane of line 2—2 of Figure 1, the brake master cylinder being in side elevation, and showing the float switch closed to energize a signal circuit which is diagrammed; and Figure 3 is a vertical transverse section view taken substantially on the plane indicated by line 3—3 of Figure 2.

Referring to the drawings in detail, indicated generally at 10 is a vehicle fire wall having mounted thereon by brackets 22 and screws 26, a brake fluid supply reservoir, indicated generally at 12, communicating with the fluid reservoir portion 14 of a conventional brake master cylinder, indicated generally at 16, by means of a line 34 connected to the lower part of the reservoir 12, as indicated at 30, whereby fluid is fed gravitationally to the master cylinder.

The reservoir 12 is preferably rectangular and has side walls 22, end walls 28, a bottom wall 32, and a top wall 40, and contains a body 20 of hydraulic fluid.

The top wall 40 of the reservoir 12 has a filling opening 42 closed by a threaded plug 44 having a vent passage 50 therein.

The top wall 40 of the reservoir 12 also has therein a relatively large preferably circular opening 52, through which is disposed within the reservoir a fluid-level responsive float switch assembly, indicated generally at 54. On the upper side of the top wall 40 around the opening 52 is a sealing gasket 56. The switch assembly 54 comprises a circular flat plate 58 having a depending peripheral flange 59 engaged in the opening 52, and a peripheral lateral flange 60 which is engaged on the sealing gasket 56. The flange 60 is traversed by fastening elements, such as machine screws 62, extending through the gasket 56 and threaded into the top wall 40. Suitably secured to and depending from the plate 52 is a pair of laterally spaced vertical arms 64 and 66 to and between whose lower ends is secured a transverse shaft 68. The arms 64 and 66 are of electrical conducting material, and the reservoir 12 is grounded, as indicated at 70, to the chassis of the vehicle, as shown in Figure 2. A lever 72 is journaled at a point intermediate its ends, as indicated at 73, on the shaft 68, and includes at opposite sides of the journal 73, a long arm 75 and a short arm 77. A preferably transversely elongated cylindrical float 76 is recessed cornerwise on the free end of the long arm 75. On the upper side of the free end of the short arm 77 is secured a contact point 78.

The plate 58 has at one side of the arms 64 and 66 a relatively small opening 84, through which extends a grommet 96 of dielectric material, having on its upper and lower ends flanges which engage the upper and lower surfaces of the plate 58. Extending through the grommet 86 is the shank 89 of a conductor bolt and nut assembly, indicated generally at 88. A head 87 on the bolt shank bears against the lower grommet flange and a terminal 90 is secured on the upper end of the shank 89 by a nut 91 threaded on the upper end of the shank 89, and has received thereto an insulated wire 92, leading to the ungrounded side of a signal, such as a bulb 100, whose other side is connected by a manual switch 102 to the ungrounded side of a battery 104 which is grounded at 106.

Clamped on the bolt shank 89 between the bolt head 87 and the lever flange of the grommet 86, is the upper end of a contactor arm 94 which declines in a direction away from the long arm 75 of the lever 72 and toward the short arm 77 of the lever 72. The arm 94 terminates at its lower end in a depending vertical portion 98 which has a contact point 99 facing the short lever arm 77, which is engageable by the contact point 78 on the arm 77 when the flat lever 72 subsides, due to a lowering of the fluid body 20, from the full line to the phantom line position shown in Figure 2, so that the signal 100 is energized.

Thus it is readily apparent that when the level of the brake fluid 20 in the container 18 diminishes below a predetermined level the signal means 100 disposed on the dashboard of a vehicle, for example, will be activated and accordingly a driver of said vehicle will be readily apprised of the condition of a diminishing supply of hydraulic brake fluid in the hydraulic brake system. It will be further noted, that the auxiliary supply of brake fluid even though it has descended to a level wherein a signal means will be activated, the hydraulic master cylinder can still be actuated due to the normal supply of hydraulic brake fluid therein.

The foregoing is considered as illustrative only of the principles of the invention. Since numerous modifications and changes will readily occur to those skilled in the art, it is not desired to limit the invention to the exact construction and operation shown and described, accordingly all suitable modifications and changes may be resorted to, as fall within the scope of the appended claims.

What is claimed is:

1. In a float switch for a hydraulic fluid reservoir having a top wall having a relatively large opening therein, a flat plate having a peripheral depending flange to be engaged in said opening, means removably securing the plate in place, a pair of laterally spaced vertical arms secured to and depending from said plate, a transverse shaft extending between and secured to the lower portions of said arms, a float lever having a journal intermediate its ends engaged on said shaft between said arms, said lever having a long arm at one side of said journal and a short arm at the other side thereof, said long arm having a free end on which is fixed a float, said short arm having an upper side on which is fixed a first contact point, and a contactor assembly on and insulated from said plate and having below the plate a depending vertical contactor arm having a lower end portion having thereon a second contact point facing the contact point on the short arm of the float lever, said first contact point being disengaged from said second contact point while the level of the fluid body is high and being arranged to engage the second contact point when the float and the lever pivot downwardly when the level of the fluid body is low.

2. In a float switch for a hydraulic fluid reservoir having a top wall having a relatively large opening therein, a flat plate having a peripheral depending flange to be engaged in said opening, means removably securing the plate in place, a pair of laterally spaced vertical arms secured to and depending from said plate, a transverse shaft extending between and secured to the lower portions of said arms, a float lever having a journal intermediate its ends engaged on said shaft between said arms, said lever having a long arm at one side of said journal and a short arm at the other side thereof, said long arm having a free end on which is fixed a float, said short arm having an upper side on which is fixed a first contact point, and a contactor assembly on and insulated from said plate and having below the plate a depending vertical contactor arm having a lower end portion having thereon a second contact point facing the contact point on the short arm of the float lever, said first lever contact point being disengaged from said second contact point while the level of the fluid body is high and being arranged to engage the second contact point when the float and the lever pivot downwardly when the level of the fluid body is low, said contactor assembly comprising a dielectric grommet traversing said plate, a vertical conductor bolt shank traversing the grommet and having a head on its lower end at the lower end of the grommet, a terminal on the upper end of the bolt shank at the upper end of the grommet, a nut threaded on the upper end of the bolt shank onto the terminal, said contactor arm having an upper end portion engaged on the bolt shank and clamped between the grommet and said head.

References Cited in the file of this patent

UNITED STATES PATENTS

| | | |
|---|---|---|
| 440,925 | Riggs | Nov. 18, 1890 |
| 1,127,084 | Ogilvie et al. | Feb. 2, 1915 |
| 1,962,125 | Burkle | June 12, 1934 |
| 2,085,173 | Stansbury | June 29, 1937 |
| 2,467,189 | Cohen et al. | Apr. 12, 1949 |
| 2,494,802 | Fox | Jan. 17, 1950 |
| 2,613,293 | Marks | Oct. 7, 1952 |
| 2,748,378 | Feins | May 29, 1956 |